UNITED STATES PATENT OFFICE.

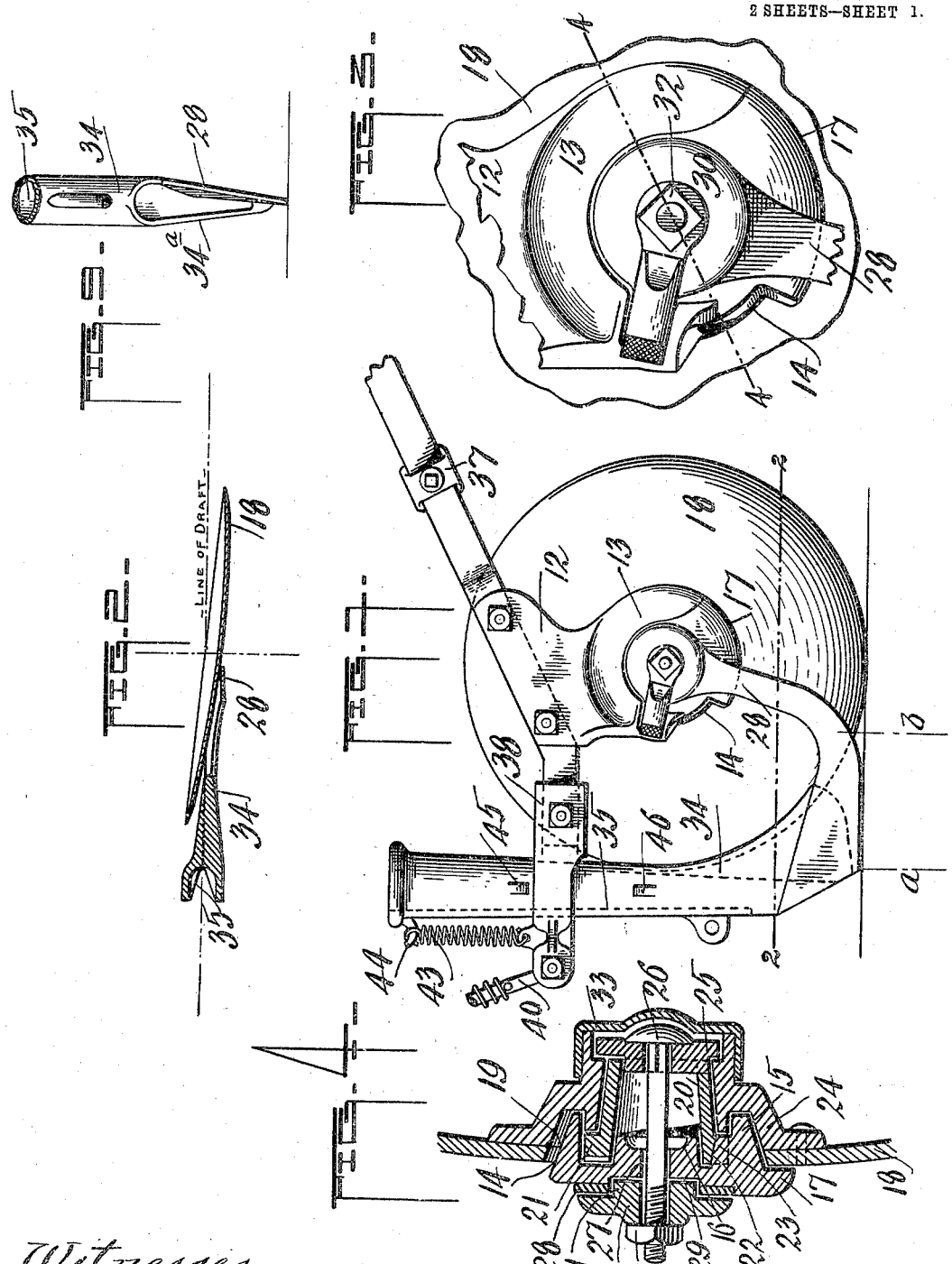

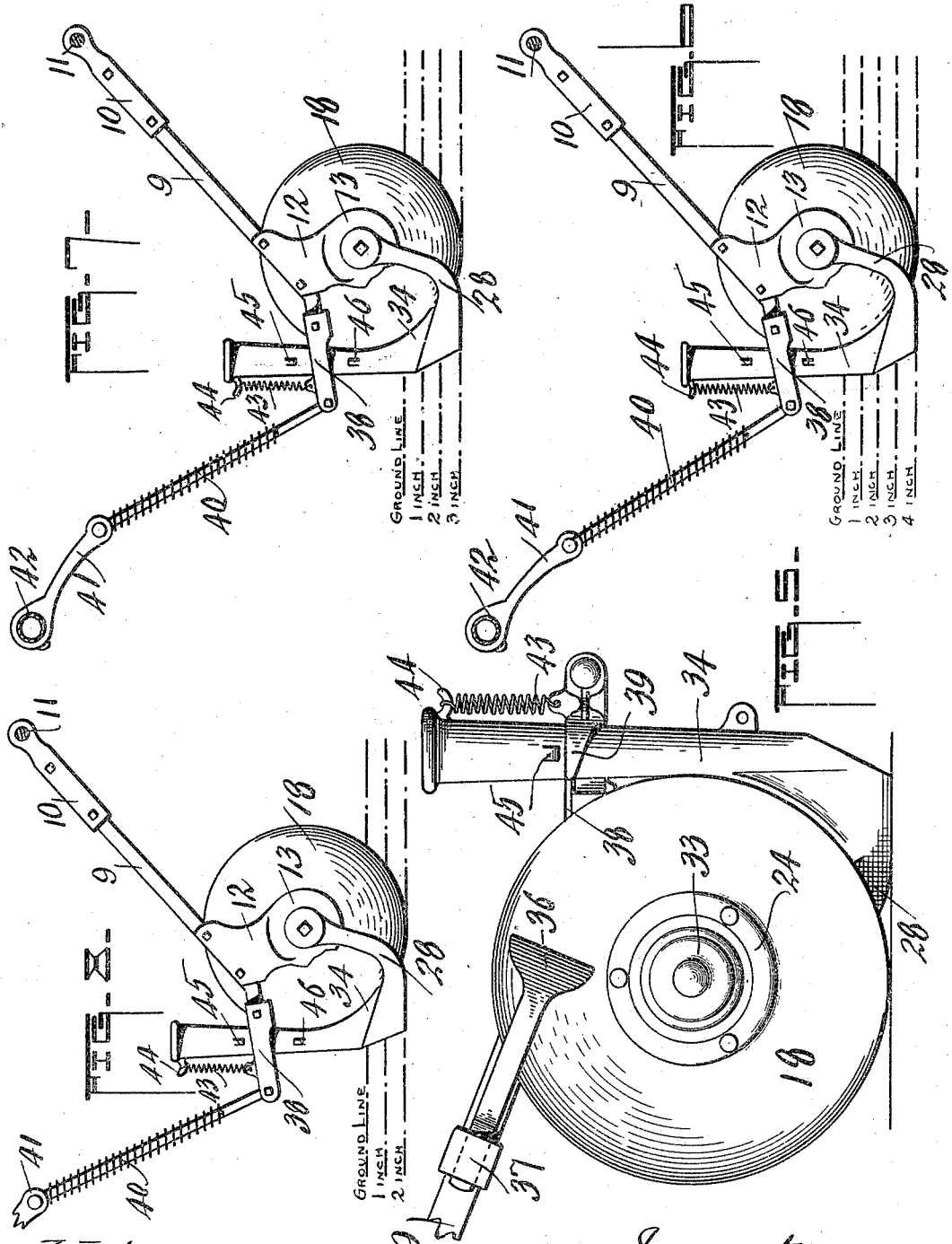

CLARENCE A. PATTISON AND LUTHER E. ROBY, OF PEORIA, ILLINOIS.

GRAIN-DRILL.

951,741.   Specification of Letters Patent.   Patented Mar. 8, 1910.

Application filed August 20, 1909. Serial No. 513,884.

*To all whom it may concern:*

Be it known that we, CLARENCE A. PATTISON and LUTHER E. ROBY, citizens of the United States, residing at Peoria, in the county of Peoria and State of Illinois, have invented certain new and useful Improvements in Grain-Drills; and we do hereby declare that the following is a full, clear, and exact description of the invention, which will enable others skilled in the art to which it appertains to make and use the same.

This invention has reference to grain-drills and particularly to a type which we have designated a disk shoe-drill, being that type of drill having a disk which cuts the way for a shoe or runner attached to or forming a part of a seed conducting tube or shank, said shoe or runner follows behind the disk and forms the furrow. The conducting tube or shank is attached to the disk or disk supporting means through said shoe or runner.

One of the objects of the present invention is to provide a seed conducting tube or shank with a runner or shoe, preferably connected to the disk or disk support, in such a manner that the lower or runner edge of the shoe will always travel on the bottom of the furrow formed by the shoe which follows in the cut made by the disk, that the seed which is conducted through the shank will be deposited on the bottom of the furrow.

A further object of the invention is to combine with a disk, a shank having a runner or shoe so arranged that no matter what depth the disk is forced into the ground, the shoe will not only follow in the line of draft of the disk, but will also extend into the cut made by the disk and form or shape the furrow, moving along on the bottom of the furrow and keep the furrow open until after the deposit of seed therein; the said shoe or runner having a straightened running or cutting edge directly in the line of draft of the disk, which said disk is set at an angle to the line of draft, said straightened edge of the shoe extending from the rear of said shoe to a point in proximity to the disk or where the shoe and disk coincide, when the shoe is bent upwardly and carried to a point where the shoe is connected to the disk or disk support. The rear end portion of the shoe or runner is attached to or may form a part of the lower end of the seed conducting tube or shank, which is preferably V shaped and by constructing the lower portion of the said seed conducting tube or shank and runner in this manner, it insures a packed seed bottom or a packed sub-surface on which the seed is deposited, and also packs the sides of said furrow and prevents loose ground from falling in and covering the bottom of the furrow until after the deposit of seed therein.

For a further and full description of the invention herein and the merits thereof and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which:—

Figure 1 is a side elevation of our improved disk-shoe-drill, looking at the land-side of the disk; Fig. 2 is a cross-section in plan, as the same would appear on the line 2—2 of Fig. 1; Fig. 3 is an enlarged side elevation of the bearing for the disk and shoe; Fig. 4 is a cross-section as the same would appear if taken on the line 4—4 of Fig. 3; Fig. 5 is a side elevation of our improved disk-shoe-drill, looking at the furrow-side of the disk; Fig. 6 is a view of the disk, shoe and shank and associated parts showing the relation of the disk and shoe when the disk is traveling four inches in the ground. It will be seen that the runner edge of the shoe is traveling on the bottom of the furrow; Fig. 7 is a view similar to Fig. 6, showing the relation of shoe and disk, when the disk is three inches in the ground; Fig. 8 is a view similar to Fig. 6, showing the relation of shoe and disk, when the disk is two inches in the ground, and Fig. 9 is a rear elevation of the lower portion of the feed conducting tube or shank, with the runner attached thereto and shows the V shape construction which insures the packed seed bottom and sides of the furrow.

Like characters of reference indicate corresponding parts throughout the figures.

In the drawings, 9 denotes a draw-bar which may be of the usual or approved construction, which is attached to an arm 10 and said arm may be pivotally hung at 11 to any suitable frame part of a drill. From the draw-bar, at or near its inner end, is hung a bracket 12. This bracket is formed with the lower bearing portion 13, a portion of which is cut away as at 14, for a purpose which will be explained. Extending from the rear side of the portion 13 of the bracket are a pair of annular bearing rings 15 and 16, 15 designating the outer ring and 16 designating the inner ring. The formation of the ring 15 leaves an annular flange 17 and it is this flange which is cut away, as at 14. In assembling, the disk 18, which has an opening 19, will be passed over the ring 15, bringing the convex or landside of the disk adjacent the flange 17 of the bearing 13. Before this is done, however, a removable sleeve bearing 20, which is preferably cone shaped, and provided with a flange 21, is inserted into the ring 15 and over the ring 16; the bearing 20 being locked against rotation by providing the flange 21 with a slot 22 fitting over a lug 23, see Fig. 4, projecting inwardly from the flange 15. When the disk is passed over the ring 15, a bearing 24 which is riveted, or otherwise suitably secured to the disk, is passed over the sleeve bearing 20 and a portion of said bearing 24 is inserted under the inner end of ring 15 and brought into proximity to the flange 21 of sleeve bearing 20. A disk 25 is then inserted in the open end of bearing 24 and against the end of sleeve bearing 20, when a bolt or spindle 26 is inserted through washer 25, sleeve bearing 20 and through an opening 27 in bearing plate 13, projecting for enough through, so that a bearing may be formed for the upper end of a shoe or runner 28. The outer face of the bearing plate 13 is provided with an annular recess 29, and the opening in the upper end of the runner is preferably of the same diameter as said recess. To attach the runner so that it may have a pivoted relation with disk and disk support, the upper end of runner is passed over the end of the bolt or spindle 26, bringing the end of runner adjacent to the bearing plate 13, when a washer 30 having an annular shoulder 31 is passed over the bolt or spindle 26, inserting the shoulder 31 of washer 30 through the opening in the end of runner and seating said annular shoulder 31 in the recess 29 of bearing plate 13. This done, the parts are retained in this relation by a nut 32 screwed on the end of the bolt 26. Over the open end of bearing 24 is placed a dust cap 33.

What has been referred to as the flange 17 of the bearing plate 13 covers the opening 19 in the disk 18 with the exception of the cut-out portion 14 which will expose the opening 19 of the disk or any portion thereof which is caused to coincide or pass said cut-out portion, as will be seen from an examination of Figs. 3 and 4. By cutting the flange 17 as at 14 and exposing the opening 19 in the disk, we provide a self cleaning bearing for a disk for any sand or dirt which finds its way into the bearing, through the operation of the disk. As the disk is revolved, the sand and dirt will be ejected or discharged from the bearing when the opening 19 coincides or passes the cut-out portion 14. The result is that whereas the sleeve bearing 20 which is found in several makes of disks and which has largely taken up the wear and has had to be replaced very often, is worn little, if any, and very few, if any, are ever replaced.

The runner or shoe 28 is attached to or forms a part of a seed conducting tube or shank 34, of the closed delivery type, the lower end of said tube or shank formed with beveled sides 34$^a$, to one of which said sides the rear end portion of the runner or shoe 28 is attached or forms an integral part thereof, if desired. This tube or shank 34 having a feed conduit 35 extending from the upper to the lower end thereof, and said shank or tube 34 is preferably carried, as shown in Figs. 1, 2 and 3 on the convex or land-side of the disk 18, with the runner or shoe extending forwardly and upwardly from the delivery end of said shank to a point where it is connected to the disk or disk support in the manner previously described. The disk is mounted diagonally to the line of draft, as shown in Fig. 2, whereas the runner or shoe, particularly the lower runner edge thereof, is directly in the line of draft, so as to follow in the cut made by the disk and form the furrow and ride on the bottom thereof, packing the seed bottom or sub-surface preparatory to the seed being deposited therein, and by beveling or tapering the lower portion of the feed conducting tube or shank, to which is attached the rear end portion of the shoe, not only is the bottom or sub-surface of the furrow packed, but the side walls of the furrow are also packed, and this prevents the loose soil or ground falling into or filling the furrow until after the seed has been deposited therein. To accomplish this, that portion of the runner or shoe between points $a$—$b$, see Fig. 1, is straightened, and disposed at an incline, as shown in Fig. 9, by being attached to one of the beveled faces of the lower end of the tube or shank, and being in the line of draft, it naturally follows that the runner or shoe will form the furrow following in the cut of the disk as it does and hold the furrow open, leaving little or no space between where the disk leaves off and the runner or shoe begins, so that there is little chance for the loose dirt to fall in and cover the furrow bottom until the seed is in. By packing the seed bottom or sub-surface, and the wall of the furrow, the moisture is drawn to the seed or grain deposited in the furrow, and the loose ground falling in or caused to cover the seed, holds the moisture. The lower edge of the runner or shoe extends straight from its rear end to a point adjacent to the disk, see Fig. 2, when the shoe is bent outwardly and carried upwardly and its upper free end pivotally attached to the disk or disk support, whereby the runner and shank may rise and fall with the disk or independently thereof, so that no matter to what depth the disk may be depressed, the runner and lower end of the tube or shank are moved likewise and pack the seed bottom as well as the side walls of said furrow.

The runner or shoe 28 is in no sense a scraper, but rather forms a connection, and the only connection, between the disk or disk support and shank to be drawn forward by the movement of the disk or disk support and operates to form the furrow, following as it does the cut made by the disk and packs the seed bottom and side walls of the furrow, as previously explained. In other words, the runner 28 is a cutter or divider as distinguished from a scraper, having for its only function, in addition to serving as a connection between the seed conducting tube or shank and disk or disk support, to cut or divide the earth in coöperation with the disk, spreading and holding open the furrow cut by the disk, into which the seed or grain drops. The convex or land-side of the disk, adjacent to which the runner is located, as is understood, runs against hard ground and there is really no occasion for a scraper on this side of the disk. However, there is a scraper for the concave or furrow side of the disk, upon which no claim is made in this application. This scraper is indicated as 36 and is connected with a member 37, longitudinally adjustable on the draw-bar 9, see Figs. 1 and 2.

It is obvious that by providing a furrow opener, such as we show, which follows in the cut made by the disk for the purpose of packing the seed bottom as well as the side walls of the furrow, the runner will scour and clean, which is a very desirable feature in a construction of this type.

Extending rearwardly from the rear end of the draw-bar 9 is a bracket guide 38 which is rigidly secured to said draw bar, and said bracket is carried across the land-side of the shank 34 to a point beyond the same, and is formed with a curved arm 39 passing around the shank in the manner shown. To the rear end of bracket guide 38 is attached the lower end of the spring-lift rod 40 which is attached at its opposite end to an arm 41 secured to a rock shaft 42. Said bracket guide 38 has also attached thereto, a coil spring 43, which has its opposite end attached to a hook 44 projecting from the upper end of the shank. Through the rod 40, the depth of the disk in the ground may be regulated. To lower the rod will depress the draw-bar 9 and as the drill is moved forward, the disk will cut its way into the ground producing a furrow in which will follow the shoe or runner 28. The spring 43, while it has a tendency, when the disk is forced into the ground, to force the shank down into the furrow, that is not its sole object, as it is employed largely to steady the shank in its relation to the disk. On the shank, are provided lugs 45 and a lug 46. When lifting disk and shank, the bracket guide and curved arm thereof will engage with lugs 45. The lug 46 is used to protect the spring 43. For instance, should the runner or shoe and shank be accidentally raised, the lug 46 will engage with the bracket guide 38, and thereby protect the spring.

Having thus fully described our invention, what we claim and desire to secure by Letters Patent of the United States, is:—

1. In a grain drill, in combination, a disk, a support including a bearing for the disk, said disk having its cutting edge disposed diagonally to the line of draft, a shank, a shoe extending from the delivery end of the shank and having its forward end attached to said disk and its support, said shoe having a straightened portion disposed directly in the line of draft and extending from its rear end to a point adjacent the disk, and thence outwardly and upwardly to its point of connection with the disk and its support.

2. In a grain drill, in combination, a disk, a support including a bearing for the disk, said disk having its cutting edge disposed diagonally to the line of draft, a shank formed with a seed conduit and having a wedge shaped lower end, a shoe extending from the wedge shaped lower end of the shank and having its forward end attached to said disk and its support, said shoe having a straightened portion disposed directly in the line of draft and extending from its rear end to a point adjacent the disk, and thence outwardly and upwardly to its point of connection with the disk and its support.

In testimony whereof we affix our signatures, in presence of two witnesses.

CLARENCE A. PATTISON.
LUTHER E. ROBY.

Witnesses:
   Chas. W. La Porte,
   Laura E. Claypool.